United States Patent
Boone et al.

(10) Patent No.: US 10,015,369 B2
(45) Date of Patent: Jul. 3, 2018

(54) SYNCHRONIZATION OF CAMERAS USING WIRELESS BEACONS

(71) Applicant: GoPro, Inc., San Mateo, CA (US)

(72) Inventors: David A. Boone, Belmont, CA (US); Bich Nguyen, Los Altos, CA (US); Pavan Kumar, Fremont, CA (US)

(73) Assignee: GOPRO, INC., San Mateo, CA (US)

( * ) Notice: Subject to any disclaimer, the term of this patent is extended or adjusted under 35 U.S.C. 154(b) by 56 days.

(21) Appl. No.: 15/146,639

(22) Filed: May 4, 2016

(65) Prior Publication Data

US 2017/0324888 A1 Nov. 9, 2017

(51) Int. Cl.
| | |
|---|---|
| *H04N 5/931* | (2006.01) |
| *H04N 5/932* | (2006.01) |
| *H04N 5/04* | (2006.01) |
| *H04W 56/00* | (2009.01) |
| *H04L 5/00* | (2006.01) |
| *H04N 5/247* | (2006.01) |
| *G11B 27/10* | (2006.01) |
| *H04W 84/12* | (2009.01) |

(52) U.S. Cl.
CPC ............ *H04N 5/04* (2013.01); *G11B 27/10* (2013.01); *H04L 5/005* (2013.01); *H04N 5/247* (2013.01); *H04W 56/0015* (2013.01); *H04W 84/12* (2013.01)

(58) Field of Classification Search
None
See application file for complete search history.

(56) References Cited

U.S. PATENT DOCUMENTS

2008/0170551 A1* 7/2008 Zaks ............... H04W 52/0229
370/338

\* cited by examiner

*Primary Examiner* — Heather Jones
(74) *Attorney, Agent, or Firm* — Gazdzinski & Associates, PC

(57) ABSTRACT

Timing metadata is generated and added to captured video to compensate for synchronization error between video captured concurrently from multiple cameras. A wireless beacon including timer data is transmitted from an access point to each station camera. A radio circuit of the station camera synchronizes to the timer of the access point based on timing information in the wireless beacon. An image processor in each station camera includes an image processor timer separate from the radio circuit timer. During video capture, timing metrics are generated indicating deviation between the image processor timer and the radio circuit timer. The timing metrics are stored as metadata and can be used to compensate for synchronization error in post-processing.

18 Claims, 4 Drawing Sheets

SYNCHRONIZATION OF CAMERAS USING WIRELESS BEACONS

BACKGROUND

Field of Art

The disclosure generally relates to cameras and in particular to capturing timing metadata for synchronizing video captured from multiple cameras.

Description of Art

It is often desirable to capture video of an event concurrently with multiple different cameras in order to capture the event from multiple different perspectives. Conventionally, each camera independently records the video and stores it to a video file. In post-process editing, a video maker often wants to combine different portions of the different video files to produce a single cohesive video. For example, the video may include cuts from one camera view to another or may include split screen effects to concurrently display video from two or more cameras. A mechanism for determining the relative timing between each of the independently captured video files is therefore desirable.

SUMMARY

In one aspect of the present disclosure, a method is disclosed. In one embodiment thereof, the method is for generating timing data representing timing of a video capture relative to a master timing, and the method includes: receiving, a wireless beacon signal from an access point device, the wireless beacon signal including a current beacon timestamp generated from a timer of the access point device; synchronizing a radio circuit timer of the radio circuit to the current beacon timestamp received from the access point device; sending a timing query request from an image processor of the station camera to the radio circuit of the station camera; responsive to the timing query request, capturing by the radio circuit a current radio circuit timestamp representing a current value of the radio circuit timer, and outputting an interrupt signal to image processor; responsive to the image processor receiving the interrupt signal, capturing a current image processor timestamp representing a current value of an image processor timer, the image processor timer operating from a separate oscillator than the radio circuit timer; reading the current radio circuit timestamp captured by the radio circuit; calculating one or more timing metrics representing a time deviation between the radio circuit timer and the image processor timer based on at least the current radio circuit timestamp and the current image processor timestamp; and storing the one or more timing metrics as metadata in association with one or more video frames captured concurrently with the radio circuit timestamp and the image processor timestamp.

In another aspect of the present disclosure, a non-transitory computer-readable medium is disclosed. In one embodiment thereof, the non-transitory computer-readable medium stores instructions for generating timing data representing timing of a video capture relative to a master timing, and the instructions when executed by a processor cause the processor to perform steps including: receiving a wireless beacon signal from an access point device, the wireless beacon signal including a current beacon timestamp generated from a timer of the access point device; synchronizing a radio circuit timer of the radio circuit to the current beacon timestamp received from the access point device; sending a timing query request from an image processor of the station camera to the radio circuit of the station camera; responsive to the timing query request, capturing by the radio circuit a current radio circuit timestamp representing a current value of the radio circuit timer, and outputting an interrupt signal to image processor; responsive to the image processor receiving the interrupt signal, capturing a current image processor timestamp representing a current value of an image processor timer, the image processor timer operating from a separate oscillator than the radio circuit timer; reading the current radio circuit timestamp captured by the radio circuit; calculating one or more timing metrics representing a time deviation between the radio circuit timer and the image processor timer based on at least the current radio circuit timestamp and the current image processor timestamp; and storing the one or more timing metrics as metadata in association with one or more video frames captured concurrently with the radio circuit timestamp and the image processor timestamp.

In yet another aspect of the present disclosure, a camera device is disclosed. In one embodiment, the camera device includes: a radio integrated circuit and an image processing circuit.

In one variant thereof, the radio integrated circuit includes: a radio circuit timer including a first oscillator and a first digital counter to count a number of oscillations of the first oscillator; and radio circuit logic to receive a wireless beacon signal from an access point device, the wireless beacon signal including a current beacon timestamp generated from a timer of the access point device, to synchronize the radio circuit timer to the current beacon timestamp received from the access point device, and to capture a radio circuit current radio circuit timestamp representing a current value of the radio circuit timer and output an interrupt signal on an external pin responsive to receiving a timing query request.

In another variant, image processor circuit includes: an image processor timer including a second oscillator and a second digital counter to count a number of oscillations of the second oscillator; a processor; and a non-transitory computer-readable medium storing instructions that when executed by the processor cause the processor to perform steps including: sending the timing query request to the radio circuit logic of the radio integrated circuit; responsive to receiving the interrupt signal from the radio circuit logic via an external pin of the image processor circuit, capturing, a current image processor timestamp representing a current value of the image processor timer; reading the current radio circuit timestamp captured by the radio circuit; calculating one or more timing metrics representing a time deviation between the radio circuit timer and the image processor timer based on at least the current radio circuit timestamp and the current image processor timestamp; and storing the one or more timing metrics as metadata in association with one or more video frames captured concurrently with the radio circuit timestamp and the image processor timestamp.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
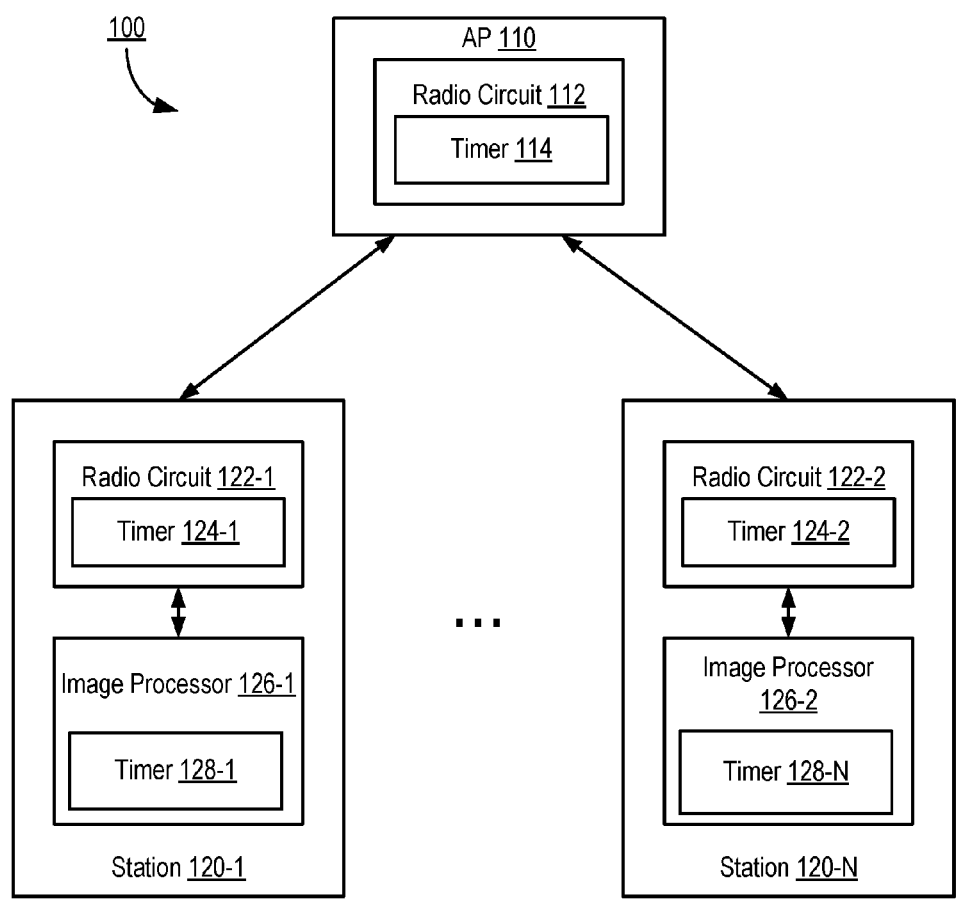
FIG. 1 is a block diagram illustrating an example system in which multiple cameras configured as stations communicate with an access point device.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A camera includes a radio circuit and an image processor. The radio circuit communicates with an access point device via a wireless network. The radio circuit includes a timer having a first oscillator and a first digital counter to count a number of oscillations of the oscillator and thereby provide timing information. Radio circuit logic receives a wireless beacon signal from an access point device that includes a current beacon timestamp generated from a timer of the access point device. The radio circuit logic synchronizes the radio circuit timer to the current beacon timestamp received from the access point to maintain synchronization between the radio circuit timer and the timer of the access point.

The image processor includes an image processor timer having a second oscillator and a second digital counter to count a number of oscillations of the second oscillator to maintain timing information. During video capture, the image processor transmits a timing query request to the radio circuit and in response, the radio circuit outputs an interrupt signal on an external pin to the image processor and also captures the a current radio circuit timestamp representing a current value of the radio circuit timer. In response to detecting the interrupt, the image processor captures a current image processor timestamp representing a current value of the image processor timer. The image processor then reads the current radio circuit timestamp from the radio circuit. The image processor calculates one or more timing metrics representing a time deviation between the radio circuit timer and the image processor timer based on the current radio circuit timestamp and the current image processor timestamp. The timing metrics are stored as metadata in association with one or more video frames captured concurrently with the radio circuit timestamp and the image processor timestamp. In post-processing, the timing metadata may be used to synchronize video from multiple different cameras each connected to the same access point.

Example System Configuration

FIG. 1 is a system diagram illustrating an example system environment 100. The system environment 100 comprises an access point (AP) 110 and one or more stations 120-1 . . . 120-N. Each station 120 may comprise a wirelessly-enabled camera for capturing and storing video. The access point 110 may also comprise a wirelessly-enabled camera. Alternatively, the access point 110 may comprise another wireless device that is not necessarily a camera such as a smart phone, remote control device, dedicated access point, router, or other computing device. The access point 110 communicates with each of the stations 120 according to a wireless protocol to form a wireless local area network (WLAN). In one embodiment, for example, the WLAN formed by the access point 110 and stations 120 comprises a WiFi WLAN. In other embodiments, a different network protocol may be used such as, for example, Bluetooth, cellular protocols, or other wireless communication protocols. Among other components, the access point 110 comprises a radio circuit 112 which communicates with radio circuits 122 of the stations 120. The stations 120 furthermore each comprise an image processor 126 to process images captured by the cameras. The radio circuit 112 of the access point 110 comprises a timer 114 that maintains a master time to which the stations 120 synchronize. Particularly, the access point 110 transmits periodic beacons to the stations 120 containing a current timestamp read from the timer 114. The radio circuits 122 of the stations 120 receive the timestamp in the beacons and synchronize their radio circuit timers 124 to the timestamp so as to maintain synchronization between the timer 114 of the access point and the timers 124 of the stations. In on embodiment, synchronization of the timers 124 of the stations 120 with the timer 114 of the access point 110 occurs according to a Time Synchronization Function (TSF) that is part of the WiFi protocol. As a result of this synchronization, the timers 124 of the stations each remain synchronization to the timer 114 of the access point 110 and thereby remained synchronized to each other.

In one embodiment, the radio circuit 122 and image processor 126 of each station 120 are embodied in different physical integrated circuit chips. Alternatively, the radio circuit 122 and image processor 126 may comprise different sub-systems of a single chip. In either case, the radio circuit 122 and image processor 126 may each have their own timing mechanisms that operate independently each other absent synchronization signals between the radio circuit 122 and image processor 126. For example, the radio circuit 122 and image processor 126 may each have their own oscillators (e.g., a crystal oscillator) that may oscillate at different frequencies or may drift relative to each other over time. Thus, a mechanism for determining the time differences between the timer 124-1 (which is synchronized to timer 114) and timer 128-1 is desirable to enable video captured by each image processor 126 of different stations 120 to be time-synchronized to each other.

In one embodiment, the image processor 126 of each station 120 periodically reads timing information from the timer 124 of the radio circuit 122 and from its local image processor timer 128 and computes a timing metric representing a timing difference between the respective timers 124, 128. The timing metric may comprise, for example, an offset between the timers 124, 128 or an average drift between the timers 124, 128. The timing metrics may be re-calculated periodically. For example, in an embodiment, the timing metrics are calculated once every frames or once every m minutes (e.g., m=10 minutes in one embodiment). The image processors 126 store the timing metrics as metadata associated with the captured video. For example, for a given frame or range of frames of video captured by station 120-1, the image processor 126-1 may store metadata indicating at the time that given frame or range of frames was captured, the timing metrics representing the offset, average drive, or other timing metric between the image processing timer 128-1 and the radio circuit timer 124-1 associated with capture of the given frame or range of frames. Thus, for any frame or range of frames from any of the stations 120, the captured video will have metadata indicating how, at the time of capture, the capture time of that particular frame or range of frames differs from or is changing relative to the synchronized clock maintained at the access point 110. During playback and editing, this information may be used to make relative adjustments between the timing of the different videos captured by the different stations 120.

Figure 2:
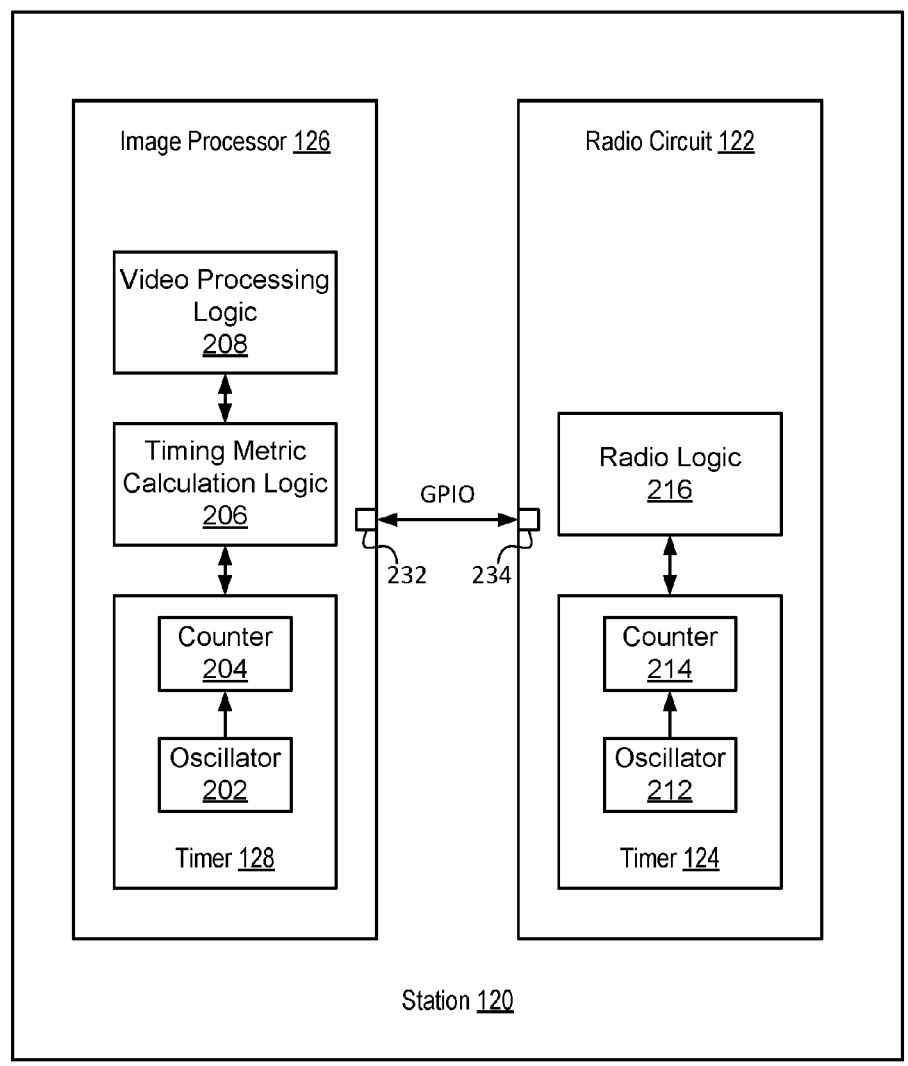
FIG. 2 is a block diagram illustrating an example station architecture.

FIG. 2 is a block diagram illustrating a more detailed example architecture of a station camera 120. A similar architecture may also be used for an access point 110 if the access point also comprises a camera. As illustrated, the image processor 126 and radio circuit 122 are embodied on separate physical chips. The radio circuit 122 includes radio logic 216 to perform various radio functions such as implementing a wireless communication protocol to communicate with other devices. The radio logic 216 may be implemented, for example, using digital logic, firmware, software, or a combination. In one embodiment, the radio logic 216 comprises a processor and a non-transitory computer-readable storage medium that stores instructions which when executed by the processor causes the processor to perform functions attributed to the radio logic 216 herein. The timer 124 of the radio circuit 122 includes an oscillator 212 and a counter 214 to count a number of oscillations and thereby generate timing information. As described above, the radio logic 216 communicates with the timer 124 to maintain synchronization of the timer 124 to the master timer 114 of the access point 110.

The image processor 126 comprises video processing logic 208 to perform various video processing functions and timing metric calculation logic 206 to determine timing metadata for including with the captured video. The timing metadata includes timing metrics representing how the timer 128 deviates from or is changing relative to the timer 124. This timing metadata may be stored at periodic intervals to track how the deviation changes over time during video capture. Therefore, at any given frame of the captured video, the metadata can be used to adjust timing to maintain synchronization between video from multiple different stations 120 that are each synchronized to the master timer of the access point 110. The video processing logic 208 and timing metric calculation logic 206 may be implemented, for example, using digital logic, firmware, software, or a combination. In one embodiment, the video processing logic 208 and timing metric calculation logic 206 comprises a processor and a non-transitory computer-readable storage medium that stores instructions which when executed by the processor causes the processor to perform functions attributed to the video processing logic 208 and timing metric calculation logic 206 herein.

The timer 128 of the image processor comprises an oscillator 202 and a counter 204 to count a number of oscillations and thereby generate timing information. Because the oscillator 202 and oscillator 212 are physically separate, they may vary in oscillating frequency or may drift relative to each other. Thus, although the timer 124 maintains synchronization with the master timer 114 of the access point 110 via the wireless protocol, the timer 128 may be out of synchronization with the timer 124. The timing metadata stored with the video tracks this synchronization error so that it can be corrected in post-processing.

In one embodiment, the image processor 126 and radio circuit 122 are coupled via one or more respective general purpose input/output (GPIO) pins 232, 234. These pins are used to trigger capture of timing information and exchange timing information between the chips 126, 122 as will be described in FIG. 3 below.

Figure 3:
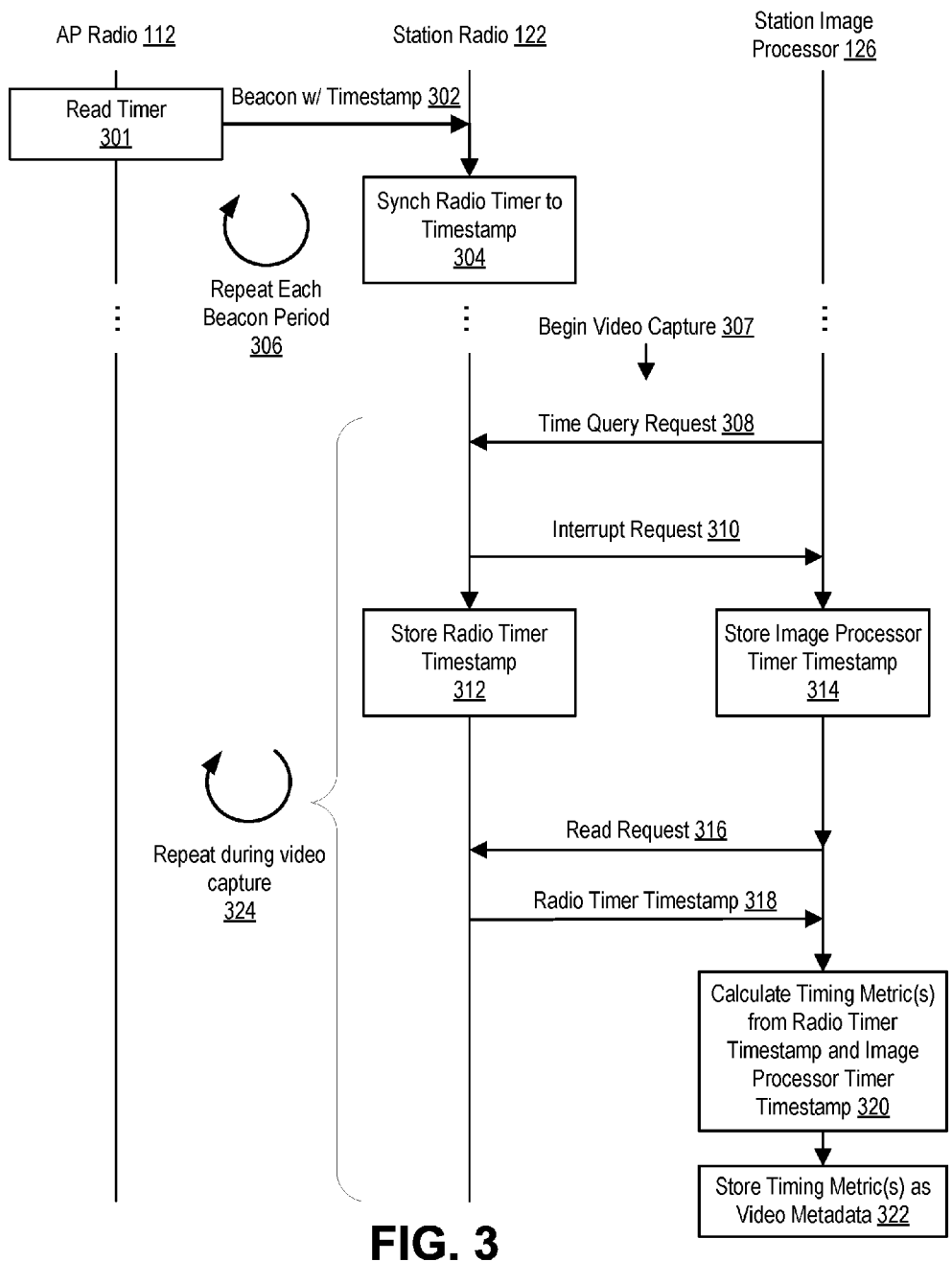
FIG. 3 is a flowchart illustrating a process for generating synchronization metadata representing relative timing information of a camera communicating with an access point device.

FIG. 3 is a flowchart illustrating an embodiment of a process for generating synchronization metadata representing relative timing information of a camera operating a station 120 communicating with an access point device 110. The access point radio circuit 112 periodically reads 301 its current timer value and sends out a beacon that includes a timestamp 302 representing the timer value. The station radio circuit 122 receives the beacon 302 and synchronizes 304 the radio timer 124 to the timestamp. Steps 301, 302, and 304 repeat 306 for each beacon period. In an example implementation, the access point radio circuit 112 and the station radio circuit 122 communicate via a WiFi protocol. In this example, steps 301, 302, and 304 are performed as part of the Timer Synchronization Function of the WiFi protocol. In other embodiments, where a different wireless protocol is used, similar steps may be performed to periodically synchronize the station radio circuit 122 to the access point radio circuit 112 using timestamp beacons.

At periodic intervals or according to other timing (e.g., upon detecting a trigger event) after beginning 307 video capture, the station image processor 126 transmits a time query request 308 to the station radio circuit 122. Upon receiving the time query request 308, the station radio circuit 122 transmits an interrupt request 310 to the image processor 126. For example, the interrupt request 312 may be transmitted by asserting a general purpose input/output (GPIO) pin 234 of the radio circuit 122 that is connected to a GPIO pin 232 of the station image processor 126 configured to trigger an interrupt routine in the image processor 126. Also upon receiving the time query request 308, the station radio circuit 122 reads its current timer value from the radio timer circuit 124 and stores 310 a radio timer timestamp representing the read value (e.g., to a buffer). Upon detecting the interrupt request 312, the image processor circuit 126 reads its current timer value from the image processor timer circuit 128 and stores an image processor timer timestamp representing the read value (e.g., to a buffer). The time between the radio circuit 122 capturing and storing the radio timer timestamp and the image processor 126 capturing and storing the image timer timestamp 314 is very small so that the timestamps are captured approximately simultaneously or the time difference has a known approximately constant latency that can be accounted for when generating the timing metrics. The station image processor 126 then transmits a read request 316 to the station radio circuit 122 requesting to read from the buffer or other memory location at which the radio timer timestamp is stored. In response to the read request 316, the station radio circuit 122 transmits the radio timer timestamp to the station image processor 126.

The station image processor 126 calculates 320 one or more timing metrics from corresponding radio timer and image processor timestamps (e.g., timestamps captured in the same synchronization cycle). For example, for each synchronization cycle $n$, the image processor 126 may calculate an offset as a difference between the image processor timestamp $t(n)_I$ and the radio circuit timestamp $t(n)_R$:

$$\text{Offset} = t(n)_I - t(n)_R$$

Furthermore, in one embodiment, the image processor 126 may calculate an average drift over a range of synchronization cycles n=1 ... N:

$$\text{Average Drift} = \frac{t(N)_I - t(1)_I}{N} - \frac{t(N)_R - t(1)_R}{N}$$

In other embodiments, different or additional timing metrics may be computed.

The image processor 126 stores 322 the timing metrics as metadata associated with one or more video frames. The cycle of steps 308-322 repeat 324 during video capture. For example, if a timing metric computation occurs once per frame, the timing metrics stored in association with a given frame may represent the offset, average drift, or other timing metric calculated at that frame. In different embodiments, the timing metric computation cycle may occur multiple times per frame (in which case a plurality of metrics for each frame may be stored), or the timing metric computation cycle may occur once every predefined number of frames (in which case a calculated set of metrics are associated with each frame in the range of frames).

In one embodiment, instead of calculating 320 the timing metrics in real-time as video is being captured, the image processor 126 may instead store a table of each pair of radio timer timestamps and image processor timestamps. Then the timing metrics may be calculated after the video capture ends. In yet another embodiment, the table itself may be stored as metadata and the calculation of relevant timing metrics may be performed in post-processing on a different device used to playback and or edit the video.

In one embodiment, in addition to storing the timing metrics, the image processor 126 may update its timer 128 after a power cycle using the last stored offset so that the image processor timer 128 and radio circuit timer 124 are approximately synchronized upon power up.

Figure 4:
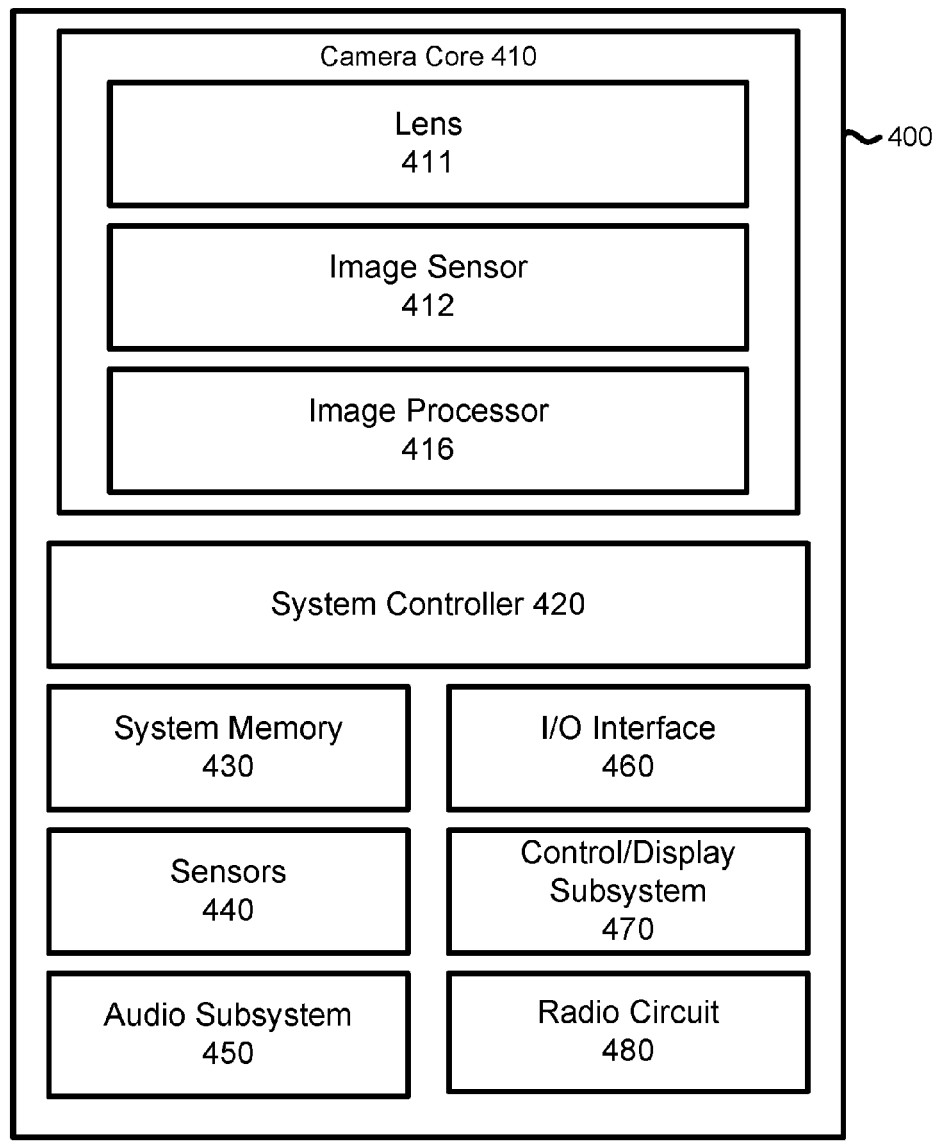
FIG. 4 is a block diagram illustrating an example camera architecture.

FIG. 4 is a block diagram illustrating an example camera 400 that may comprise a station 420 or an access point 410. The camera 400 includes a camera core 410, a system controller 420, a system memory 430, sensors 440, an audio subsystem 450, an I/O interface 460, a control/display subsystem 470, and a radio circuit 480. The camera core includes a lens 411, an image sensor 412, and an image processor 413. The components in FIG. 4 are grouped functionally and do not necessarily reflect a physical architecture of the camera 400. For example, as described above, in one embodiment, the radio circuit 480 is embodied in a separate physical integrated circuit chip from the image processor 416. The integrated circuit chip including the image processor 416 may also include, for example, the image sensor 412, the system controller 420, system memory 430 and portions of the audio sub-system 450, I/O interface 460, and control/display sub-system 470.

In the embodiment illustrated in FIG. 4, the camera 400 comprises a camera core 410 comprising a lens 412, an image sensor 414, and an image processor 416. The camera 400 additionally includes a system controller 420 (e.g., a microcontroller or microprocessor) that controls the operation and functionality of the camera 400 and system memory 430 configured to store executable computer instructions that, when executed by the system controller 420 and/or the image processors 416, perform the camera functionalities described herein. In some embodiments, a camera 400 may include multiple camera cores 410 to capture fields of view in different directions which may then be stitched together to form a cohesive image. For example, in an embodiment of a spherical camera system, the camera 400 may include two camera cores 410 each having a hemispherical or hyper hemispherical lens that each capture a hemispherical or hyper-hemispherical field of view which are stitched together in post-processing to form a spherical image.

The lens 412 can be, for example, a wide angle lens, hemispherical, or hyper hemispherical lens that focuses light entering the lens to the image sensor 414 which captures images and/or video frames. The image sensor 414 may capture high-definition video having a resolution of, for example, 720p, 1080p, 4 k, or higher. For video, the image sensor 414 may capture video at frame rates of, for example, 30 frames per second, 60 frames per second, or higher. The image processor 416 performs one or more image processing functions of the captured images or video. For example, the image processor 416 may perform a Bayer transformation, demosaicing, noise reduction, image sharpening, image stabilization, rolling shutter artifact reduction, color space conversion, compression, or other in-camera processing functions. The image processor 416 may furthermore perform the timing metric calculations discussed above. Processed images and video may be temporarily or persistently stored to system memory 430 and/or to a non-volatile storage, which may be in the form of internal storage or an external memory card.

An input/output (I/O) interface 460 transmits and receives data from various external devices. For example, the I/O interface 460 may facilitate the receiving or transmitting video or audio information through an I/O port. Examples of I/O ports or interfaces include USB ports, HDMI ports, Ethernet ports, audio ports, and the like. Furthermore, embodiments of the I/O interface 460 may include wireless ports that can accommodate wireless connections. Examples of wireless ports include Bluetooth, Wireless USB, Near Field Communication (NFC), and the like. The I/O interface 460 may also include an interface to synchronize the camera 400 with other cameras or with other external devices, such as a remote control, a second camera, a smartphone, a client device, or a video server.

A control/display subsystem 470 includes various control and display components associated with operation of the camera 400 including, for example, LED lights, a display, buttons, microphones, speakers, and the like. The audio subsystem 450 includes, for example, one or more microphones and one or more audio processors to capture and process audio data correlated with video capture. In one embodiment, the audio subsystem 450 includes a microphone array having two or more microphones arranged to obtain directional audio signals.

Sensors 440 capture various metadata concurrently with, or separately from, video capture. For example, the sensors 440 may capture time-stamped location information based on a global positioning system (GPS) sensor, and/or an altimeter. Other sensors 440 may be used to detect and capture orientation of the camera 400 including, for example, an orientation sensor, an accelerometer, a gyroscope, or a magnetometer. Sensor data captured from the various sensors 440 may be processed to generate other types of metadata. For example, sensor data from the accelerometer may be used to generate motion metadata, comprising velocity and/or acceleration vectors representative of motion of the camera 400. Sensor data from a GPS sensor can provide GPS coordinates identifying the location of the camera 400, and the altimeter can measure the altitude of the camera 400. In one embodiment, the sensors 440 are rigidly coupled to the camera 400 such that any motion, orientation or change in location experienced by the camera 400 is also experienced by the sensors 440. The sensors 440 furthermore may associates a time stamp representing when the data was captured by each sensor. In one embodiment, the sensors 440 automatically begin collecting sensor metadata when the camera 400 begins recording a video.

The radio circuit 480 may correspond to the radio circuit 112 or radio circuit 122 described above. The radio circuit 480 may include one or more radio frequency (RF) antennas for transmitting and receiving information over a wireless network. The radio circuit 480 may also include a data processing subsystem comprising hardware and/or software for preparing data for transmission, decoding received data, and connecting to a WLAN. The data processing subsystem may implement encryption, decryption, error correction/ detection encoding/decoding, and the like. The radio circuit 480 may support a specific protocol such as the Wi-Fi protocol. The radio circuit 480 may connect in an infrastructure mode network or a peer device in an ad hoc mode network. The radio circuit 480 may also provide a means to authenticate itself to a WLAN, which may include providing network credentials, such as a password, passphrase, or a security key. In some wireless security protocols, the radio circuit 480 authenticates itself to a network using network credentials without directly transmitting said network credentials over the network.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for the disclosed embodiments. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method for generating timing data representing timing of a video capture relative to a master timing, the method comprising:
   receiving, by a radio circuit of a station camera, a wireless beacon signal from an access point device, the wireless beacon signal including a current beacon timestamp generated from a timer of the access point device;
   synchronizing a radio circuit timer of the radio circuit to the current beacon timestamp received from the access point device;
   sending a timing query request from an image processor of the station camera to the radio circuit of the station camera;
   responsive to the timing query request, capturing by the radio circuit a current radio circuit timestamp representing a current value of the radio circuit timer, and outputting an interrupt signal to image processor;
   responsive to the image processor receiving the interrupt signal, capturing by the image processor, a current image processor timestamp representing a current value of an image processor timer, the image processor timer operating from a separate oscillator than the radio circuit timer;
   reading, by the image processor, the current radio circuit timestamp captured by the radio circuit;
   calculating, by the image processor, one or more timing metrics representing a time deviation between the radio circuit timer and the image processor timer based on at least the current radio circuit timestamp and the current image processor timestamp; and
   storing the one or more timing metrics as metadata in association with one or more video frames captured concurrently with the radio circuit timestamp and the image processor timestamp.

2. The method of claim 1, wherein the calculating of the one or more timing metrics comprises:
   storing the current image processor timestamp and the current radio circuit timestamp as an entry in a table for a current synchronization cycle, the table storing a history of previously captured pairs of image processor timestamps and radio circuit timestamps for previous synchronization cycles;
   generating the timing metrics based on the table.

3. The method of claim 2, wherein the calculating of the one or more timing metrics comprises:
   determining an offset representing a time difference between the current radio circuit timestamp and the current image processor timestamp.

4. The method of claim 2, wherein the calculating of the one or more timing metrics comprises:
   determining an average drift between the image processor timer and the radio circuit timer over a given time period.

5. The method of claim 1, wherein the synchronizing of the radio circuit timer of the radio circuit to the current beacon timestamp received from the access point device comprises applying a timer synchronization function in accordance with a WiFi protocol.

6. The method of claim 1, wherein the radio circuit and the image processor are on separate physical chips, and wherein the receiving of the interrupt signal comprises detecting an asserted voltage on an external input pin of the image processor.

7. A non-transitory computer-readable medium storing instructions for generating timing data representing timing of a video capture relative to a master timing, the instructions when executed by a processor cause the processor to perform steps including:
   receiving, by a radio circuit of a station camera, a wireless beacon signal from an access point device, the wireless beacon signal including a current beacon timestamp generated from a timer of the access point device;
   synchronizing a radio circuit timer of the radio circuit to the current beacon timestamp received from the access point device;
   sending a timing query request from an image processor of the station camera to the radio circuit of the station camera;
   responsive to the timing query request, capturing by the radio circuit a current radio circuit timestamp representing a current value of the radio circuit timer, and outputting an interrupt signal to image processor;
   responsive to the image processor receiving the interrupt signal, capturing by the image processor, a current image processor timestamp representing a current value of an image processor timer, the image processor timer operating from a separate oscillator than the radio circuit timer;
   reading, by the image processor, the current radio circuit timestamp captured by the radio circuit;
   calculating, by the image processor, one or more timing metrics representing a time deviation between the radio circuit timer and the image processor timer based on at least the current radio circuit timestamp and the current image processor timestamp;

storing the one or more timing metrics as metadata in association with one or more video frames captured concurrently with the radio circuit timestamp and the image processor timestamp.

8. The non-transitory computer-readable medium of claim 7, wherein the calculating of the one or more timing metrics comprises:
storing the current image processor timestamp and the current radio circuit timestamp as an entry in a table for a current synchronization cycle, the table storing a history of previously captured pairs of image processor timestamps and radio circuit timestamps for previous synchronization cycles;
generating the timing metrics based on the table.

9. The non-transitory computer-readable medium of claim 8, wherein the calculating of the one or more timing metrics comprises:
determining an offset representing a time difference between the current radio circuit timestamp and the current image processor timestamp.

10. The non-transitory computer-readable medium of claim 8, wherein the calculating of the one or more timing metrics comprises:
determining an average drift between the image processor timer and the radio circuit timer over a given time period.

11. The non-transitory computer-readable medium of claim 7, wherein the synchronizing of the radio circuit timer of the radio circuit to the current beacon timestamp received from the access point device comprises applying a timer synchronization function in accordance with a WiFi protocol.

12. The non-transitory computer-readable medium of claim 7, wherein the radio circuit and the image processor are on separate physical chips, and wherein the receiving of the interrupt signal comprises detecting an asserted voltage on an external input pin of the image processor.

13. A camera device, comprising:
a radio integrated circuit comprising:
a radio circuit timer including a first oscillator and a first digital counter to count a number of oscillations of the first oscillator; and
radio circuit logic to receive a wireless beacon signal from an access point device, the wireless beacon signal including a current beacon timestamp generated from a timer of the access point device, to synchronize the radio circuit timer to the current beacon timestamp received from the access point device, and to capture a radio circuit current radio circuit timestamp representing a current value of the radio circuit timer and output an interrupt signal on an external pin responsive to receiving a timing query request; and
an image processor circuit comprising:
an image processor timer including a second oscillator and a second digital counter to count a number of oscillations of the second oscillator;
a processor; and
a non-transitory computer-readable medium storing instructions that when executed by the processor cause the processor to perform steps including:
sending the timing query request to the radio circuit logic of the radio integrated circuit;
responsive to receiving the interrupt signal from the radio circuit logic via an external pin of the image processor circuit, capturing, a current image processor timestamp representing a current value of the image processor timer;
reading the current radio circuit timestamp captured by the radio circuit;
calculating one or more timing metrics representing a time deviation between the radio circuit timer and the image processor timer based on at least the current radio circuit timestamp and the current image processor timestamp; and
storing the one or more timing metrics as metadata in association with one or more video frames captured concurrently with the radio circuit timestamp and the image processor timestamp.

14. The camera device of claim 13, wherein the calculating of the one or more timing metrics comprises:
storing the current image processor timestamp and the current radio circuit timestamp as an entry in a table for a current synchronization cycle, the table storing a history of previously captured pairs of image processor timestamps and radio circuit timestamps for previous synchronization cycles;
generating the timing metrics based on the table.

15. The camera device of claim 14, wherein the calculating of the one or more timing metrics comprises:
determining an offset representing a time difference between the current radio circuit timestamp and the current image processor timestamp.

16. The camera device of claim 14, wherein the calculating of the one or more timing metrics comprises:
determining an average drift between the image processor timer and the radio circuit timer over a given time period.

17. The camera device of claim 14, wherein the synchronizing of the radio circuit timer of the radio circuit to the current beacon timestamp received from the access point device comprises applying a timer synchronization function in accordance with a WiFi protocol.

18. The camera device of claim 14, wherein the radio integrated circuit and the image processor circuit are on separate physical chips.

* * * * *